(12) United States Patent
Koizumi (10) Patent No.: US 12,018,720 B2
(45) Date of Patent: Jun. 25, 2024

(54) BEARING DEVICE FOR VEHICLE WHEEL (71) Applicant: NTN Corporation, Osaka (JP)

(72) Inventor: Souta Koizumi, Iwata (JP)

(73) Assignee: NTN CORPORATION, Osaka (JP)

( * ) Notice: Subject to any disclaimer, the term of this patent is extended or adjusted under 35 U.S.C. 154(b) by 938 days.

(21) Appl. No.: 17/041,182

(22) PCT Filed: Mar. 27, 2019

(86) PCT No.: PCT/JP2019/013290
§ 371 (c)(1),
(2) Date: Sep. 24, 2020

(87) PCT Pub. No.: WO2019/189421
PCT Pub. Date: Oct. 3, 2019

(65) Prior Publication Data
US 2021/0094348 A1 Apr. 1, 2021

(30) Foreign Application Priority Data

Mar. 28, 2018 (JP) .................................. 2018-062288
Feb. 6, 2019 (JP) .................................. 2019-019973

(51) Int. Cl.
*F16C 33/41* (2006.01)
*B60B 27/00* (2006.01)
(Continued)

(52) U.S. Cl.
CPC ........ *F16C 33/416* (2013.01); *B60B 27/0005* (2013.01); *B60B 27/0094* (2013.01);
(Continued)

(58) Field of Classification Search
CPC .... F16C 19/186; F16C 33/416; F16C 33/418; F16C 43/065; F16C 43/08; F16C 2326/02;
(Continued)

(56) References Cited

U.S. PATENT DOCUMENTS 4,702,627 A * 10/1987 Pollastro ............... F16C 33/416
384/531
6,533,462 B2 3/2003 Kawakami
(Continued)

FOREIGN PATENT DOCUMENTS

JP 2002-98151 4/2002
JP 2005-180630 7/2005
(Continued)

OTHER PUBLICATIONS

Office Action dated Nov. 30, 2021 in CN Application No. 201980022839.6, with English translation.
(Continued)

*Primary Examiner* — Alan B Waits
(74) *Attorney, Agent, or Firm* — Wenderoth, Lind & Ponack, L.L.P.

(57) ABSTRACT

A bearing device for a vehicle wheel, which has an increased number of balls and in which the ease of mounting the balls is increased. The bearing device is configured such that each of the columns (7b) of the retainer (7) is provided with latch sections (7e) protruding toward adjacent columns (7b) and with cutouts. The front ends of the latches (7e) are located within an annular range having a radial width R1 defined between the outer peripheral circle of a ball (8) and a reference imaginary circle C1 having a diameter D1 centered on the center of the ball (8).

6 Claims, 8 Drawing Sheets

(51) Int. Cl.
*F16C 19/18* (2006.01)
*F16C 33/78* (2006.01)

(52) U.S. Cl.
CPC .......... *F16C 19/186* (2013.01); *F16C 33/418* (2013.01); *B60B 2380/12* (2013.01); *B60B 2380/30* (2013.01); *F16C 33/7883* (2013.01); *F16C 2326/02* (2013.01)

(58) Field of Classification Search
CPC ............ B60B 27/0005; B60B 27/0094; B60B 2380/12; B60B 2380/30
See application file for complete search history.

(56) References Cited

U.S. PATENT DOCUMENTS

| | | |
|---|---|---|
| 7,244,065 B2 | 7/2007 | Takaki et al. |
| 11,078,959 B1* | 8/2021 | Zhong ................. F16C 33/3856 |
| 11,421,735 B2* | 8/2022 | Koizumi ............... F16C 33/418 |
| 2002/0041719 A1 | 4/2002 | Kawakami |
| 2005/0135719 A1* | 6/2005 | Takaki .................... B60B 27/00 384/523 |
| 2018/0223906 A1* | 8/2018 | Kamamoto ........... F16C 33/418 |
| 2021/0331519 A1* | 10/2021 | Koizumi ............... F16C 33/418 |

FOREIGN PATENT DOCUMENTS

| | | |
|---|---|---|
| JP | 2007-239854 | 9/2007 |
| JP | 2008-261483 | 10/2008 |

OTHER PUBLICATIONS

International Search Report (ISR) dated Jun. 18, 2019 in International (PCT) Application No. PCT/JP2019/013290.

* cited by examiner

BEARING DEVICE FOR VEHICLE WHEEL

TECHNICAL FIELD

The present invention relates to a bearing device for a vehicle wheel.

BACKGROUND ART

Conventionally, a bearing device for a vehicle wheel that rotatably supports a vehicle wheel in a suspension device of an automobile or the like has been known. In the bearing device for a vehicle wheel, an inner member including a hub ring is rotatably supported by an outer member via a plurality of rolling elements (here, balls). The plurality of balls are equally arranged in the circumferential direction by the cage, and are held in a state where contact between adjacent balls is prevented.

In such a bearing device for a vehicle wheel, a bearing is known in which reducing the circumferential thickness of the pillar portions of the cage that separates adjacent balls and forming cutout portions in the pillar portions to increase the number of balls allows increasing the bearing life while keeping the cage without the problem of insufficient strength. For example, this is as described in Patent Literature 1.

In the bearing device for a vehicle wheel described in Patent Literature 1, the thickness in the circumferential direction of the pillar portion of the resin cage is reduced, and a cutout portion is formed in a portion where adjacent balls are closest to each other. That is, a pillar portion is not interposed in the closest portion between adjacent balls. Thus, in the bearing device for a vehicle wheel, it is possible to increase the number of balls without increasing the pitch diameter of the balls.

CITATIONS LIST

Patent Literature

Patent Literature 1: JP-A 2005-180630 Gazette

SUMMARY OF INVENTION

Technical Problems

In the cage of Patent Literature 1, the circumferential thickness of the pillar portion is reduced in order that the distance between adjacent balls is reduced. Therefore, when balls are incorporated into a cage, the incorporation property of balls is reduced in some cases.

The present invention has been made in view of the above situation, and an object of the present invention is to provide a bearing device for a vehicle wheel capable of increasing the number of balls and improving the incorporation property of balls into a cage.

Solutions to Problems

That is, the first aspect of the invention is a bearing device for a vehicle wheel including: an outer member provided with outer side raceway surfaces in double rows on an inner circumference; an inner member including a hub ring formed with a small diameter step portion extending in a shaft direction on an outer circumference, and at least one inner ring press-fitted into the small diameter step portion, the inner member provided with inner side raceway surfaces in double rows facing the outer side raceway surfaces in double rows on an outer circumference; balls in double rows accommodated in a rollable manner between both raceway surfaces of the outer member and the inner member; and a cage made of resin including a base portion formed in an annular shape and a plurality of pillar portions extending in a shaft direction of the bearing device for a vehicle wheel at a constant interval in a circumferential direction from the base portion, the pillar portions adjacent to each other and the base portion forming each pocket having a curved surface along an outer circumferential surface of the ball, the cage configured to hold the ball in the pocket. The pillar portion includes a claw portion protruding toward adjacent pillar portions. At least one of the pillar portions includes a cutout portion extending from a tip to a base portion. A tip portion of the claw portion is included in an annular range surrounded by a reference virtual circle having a predetermined radius centered on a center of the ball and an outer circumferential circle of the ball in a shaft direction view.

The second aspect of the invention is the bearing device for a vehicle wheel in which a guiding surface along a virtual circle having any radius from a center of the ball is formed at a tip portion of the claw portion.

The third aspect of the invention is the bearing device for a vehicle wheel in which the pocket includes a hemispherical curved surface with the base portion as a bottom portion, and a guide surface extending in a shaft direction from an edge of the hemispherical curved surface toward a tip of the pillar portion.

The fourth aspect of the invention is the bearing device for a vehicle wheel in which a diameter of the reference virtual circle having the predetermined radius is 0.8 times or more and less than 1 times a diameter of the ball.

The fifth aspect of the invention is the bearing device for a vehicle wheel in which the pillar portion includes an inner side pillar provided on an inner diameter side with respect to the cutout portion and an outer side pillar provided on an outer diameter side with respect to the cutout portion, and in which a shaft direction end surface of the inner side pillar is deviated on a center side of the ball with respect to a shaft direction end surface of the outer side pillar.

The sixth aspect of the invention is a bearing device for a vehicle wheel including: an outer member provided with outer side raceway surfaces in double rows on an inner circumference; an inner member including a hub ring formed with a small diameter step portion extending in a shaft direction on an outer circumference, and at least one inner ring press-fitted into the small diameter step portion, the inner member provided with inner side raceway surfaces in double rows facing the outer side raceway surfaces in double rows on an outer circumference; balls in double rows accommodated in a rollable manner between both raceway surfaces of the outer member and the inner member; and a cage made of resin including a base portion formed in an annular shape and a plurality of pillar portions extending in a shaft direction of the bearing device for a vehicle wheel at a constant interval in a circumferential direction from the base portion, the pillar portions adjacent to each other and the base portion forming each pocket having a curved surface along an outer circumferential surface of the ball, the cage configured to hold the ball in the pocket. In the pillar portion, an outer side pillar and an inner side pillar are formed by a cutout portion from a tip toward a base portion. In the outer side pillar, a claw portion protruding toward the adjacent outer side pillars is formed. When the ball is incorporated into the cage, a diameter of a virtual circle passing through points where the ball is simultaneously in contact with the adjacent inner side pillars and the adjacent claw portions is 0.9 times or more and less than 1 times a diameter of the ball.

Advantageous Effects of Invention

The present invention produces the following effects.

That is, according to the first aspect of the invention, since the cutout portion for making the adjacent balls close to the pillar portion of the cage is formed, the number of balls can be increased. In addition, since the range where the claw portion of the cage overlaps with the ball in a shaft direction view of the cage is limited, the deformation amount of the pillar portion of the cage when a plurality of balls are inserted into the pocket of the cage along the shaft direction of the cage can be reduced. Thus, the bearing device for a vehicle wheel can improve the incorporation property of balls while increasing the number of balls to be incorporated into the cage.

According to the second aspect of the invention, when a plurality of balls are inserted into the pocket of the cage along the shaft direction of the cage, the contact position between the claw portion and the ball approaches the outer circumferential circle of the ball due to the guiding surface formed in the claw portion of the cage. Thus, the bearing device for a vehicle wheel can prevent the deformation of the pillar portion at the time of incorporating balls even if the cutout portion for causing a ball to approach the pillar portion of the cage is formed.

According to the third aspect of the invention, when a plurality of balls are inserted into the pocket of the cage along the shaft direction of the cage, if the ball passes through the claw portion of the cage, the pillar portion of the cage is not pushed outward by the ball. Thus, even if the cutout portion for causing a ball to approach the pillar portion of the cage is formed, the bearing device for a vehicle wheel can prevent the deformation of the pillar portion at the time of incorporating balls.

According to the fourth aspect of the invention, since the range where the claw portion of the cage overlaps with the ball in a shaft direction view of the cage is limited to less than 10% of the diameter of the ball, the deformation amount of the pillar portion of the cage when a plurality of balls are inserted into the pocket of the cage along the shaft direction of the cage can be limited. Thus, even if the cutout portion for causing a ball to approach the pillar portion of the cage is formed, the bearing device for a vehicle wheel can prevent the deformation of the pillar portion at the time of incorporating balls.

According to the fifth aspect of the invention, since the shaft direction end surface of the inner side pillar is deviated on the center side of the ball with respect to the shaft direction end surface of the outer side pillar and the virtual circle is set by the inner side pillar and the claw portion, as compared with the configuration of setting the virtual circle with the inner side pillar having the shaft direction end surface whose shaft direction position coincides with the shaft direction end surface of the outer side pillar, the diameter of the virtual circle can be increased and the degree of freedom in designing the claw portion can be improved.

According to the sixth aspect of the invention, since the range where the pillar portion of the cage overlaps with the ball is limited, the deformation amount of the pillar portion of the cage when a plurality of balls are inserted into the pockets of the cage can be reduced. Thus, even if the cutout portion for causing a ball to approach the pillar portion of the cage is formed, the bearing device for a vehicle wheel can prevent the deformation of the pillar portion at the time of incorporating balls.

DESCRIPTION OF EMBODIMENTS

Hereinafter, a bearing device for a vehicle wheel 1 being an embodiment of a bearing device for a vehicle wheel according to the present invention will be described with reference to FIGS. 1 to 3.

Figure 1:
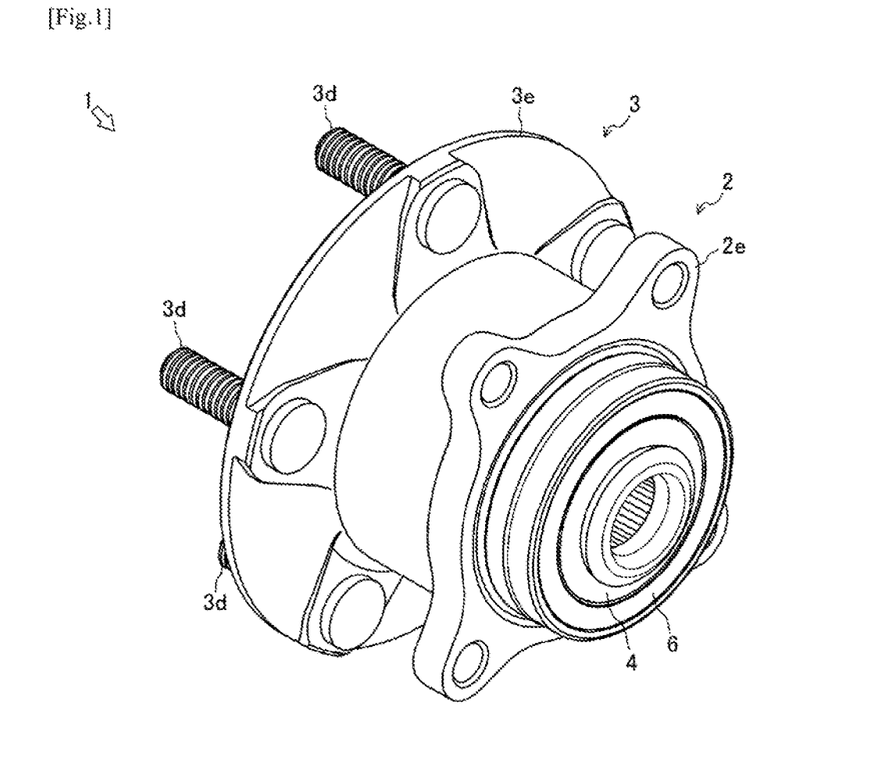
FIG. 1 is a perspective view showing an overall configuration according to a first embodiment of a bearing device for a vehicle wheel.
Figure 2:
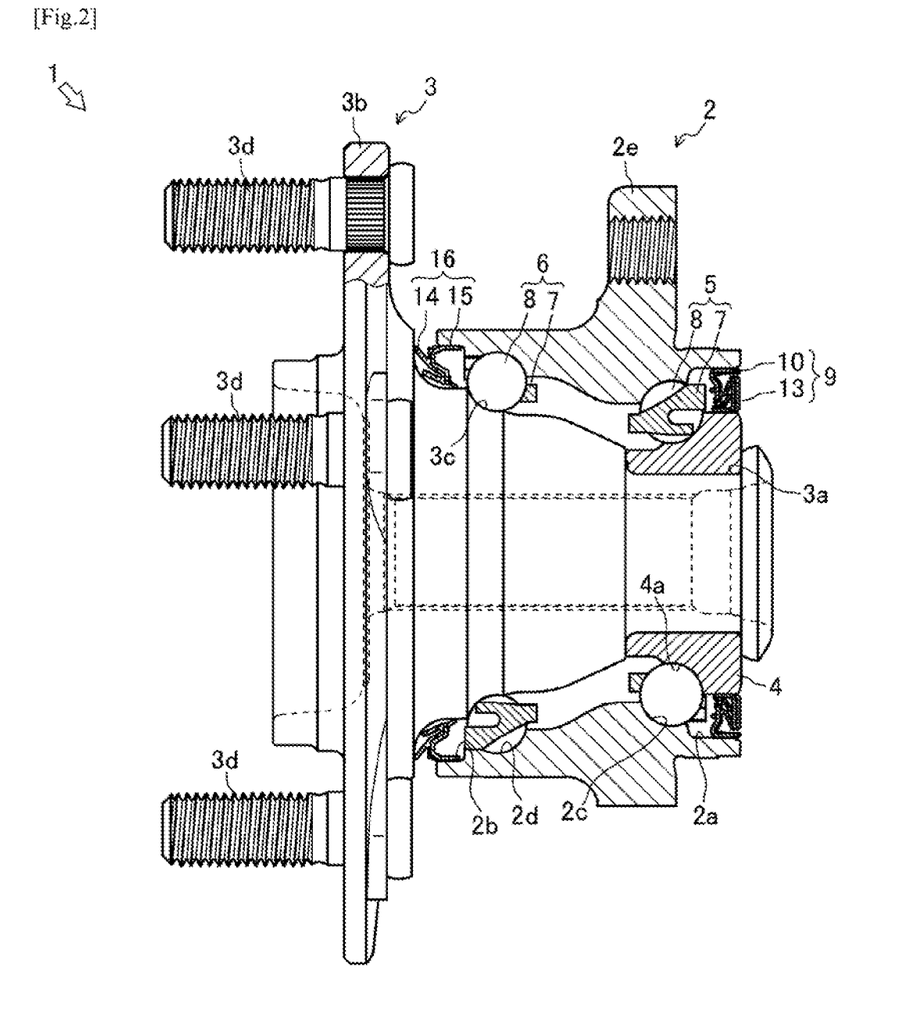
FIG. 2 is a cross-sectional view showing an overall configuration according to the first embodiment of the bearing device for a vehicle wheel.

As shown in FIGS. 1 and 2, the bearing device for a vehicle wheel 1 rotatably supports a vehicle wheel in a suspension device of a vehicle such as an automobile. The bearing device for a vehicle wheel 1 includes an outer ring 2 being an outer member, a hub ring 3 being an inner member, an inner ring 4, inner side ball rows 5 in two rows being rolling rows, an outer side ball row 6, an inner side seal member 9 being a seal member, and an outer seal member 16 being a seal member. The inner side seal member 9 and the outer side seal member 16 are bearing seals for a vehicle wheel. Here, in the present specification, the inner side represents the vehicle body side of the bearing device for a vehicle wheel 1 when the bearing device for a vehicle wheel 1 is attached to the vehicle body, and the outer side represents the vehicle wheel side of the bearing device for a vehicle wheel 1 when the bearing device for a vehicle wheel 1 is attached to the vehicle body. In addition, the direction parallel to the rotating shaft of the bearing device for a vehicle wheel 1 is represented as "shaft direction", the direction perpendicular to the rotating shaft of the bearing device for a vehicle wheel 1 is represented as "radial direction", and the direction along an arc around the rotating shaft of the bearing device for a vehicle wheel 1 is represented as a "circumferential direction".

As shown in FIG. 2, the outer ring 2 supports the hub ring 3 and the inner ring 4 via the inner side ball row 5 and the outer side ball row 6. The outer ring 2 is formed in a substantially cylindrical shape. At the inner side end portion of the outer ring 2, an inner side opening 2a into which the inner side seal member 9 can be fitted is formed. An outer side opening 2b into which the outer side seal member 16 can be fitted is formed at the outer side end portion of the outer ring 2.

On the inner circumferential surface of the outer ring 2, an outer side raceway surface 2c on the inner side and an outer side raceway surface 2d on the outer side are provided. On the outer circumferential surface of the outer ring 2, a vehicle body mounting flange 2e for being attached to a knuckle of a suspension device (not shown) is integrally formed.

The hub ring 3 rotatably supports a vehicle wheel of a vehicle (not shown). The hub ring 3 is formed in a cylindrical shape. At the inner side end portion of the hub ring 3, a small diameter step portion 3a reduced in diameter is formed on the outer circumferential surface. At the outer side end portion of the hub ring 3, a vehicle wheel mounting flange 3b for attaching a vehicle wheel is integrally formed. Hub bolts 3d are inserted into the vehicle wheel mounting flange 3b at circumferentially equidistant positions. In addition, the hub ring 3 is arranged such that the inner side raceway surface 3c on the outer side faces the outer side raceway surface 2d on the outer side of the outer ring 2. Serrations (or splines) for transmitting torque are formed on the inner circumference of the hub ring 3. The inner ring 4 is fitted into the hub ring 3 at the small diameter step portion 3a.

The inner ring 4 applies a preload to the inner side ball row 5 and the outer side ball row 6. On the outer circumferential surface of the inner ring 4, an annular inner side raceway surface 4a is formed in the circumferential direction. The inner ring 4 is fixed to the inner side end portion of the hub ring 3 by caulking. In other words, on the inner side of the hub ring 3, the inner side raceway surface 4a is formed by the inner ring 4. The inner ring 4 is arranged such that the inner side raceway surface 4a thereof faces the outer side raceway surface 2c on the inner side of the outer ring 2.

In the inner side ball row 5 and the outer side ball row 6, a plurality of balls 8 being rolling elements are annularly held by a resin cage 7. The inner side ball row 5 is sandwiched to be rollable between the inner side raceway surface 4a of the inner ring 4 and the outer side raceway surface 2c on the inner side of the outer ring 2. The outer side ball row 6 is sandwiched to be rollable between the inner side raceway surface 3c of the hub ring 3 and the outer side raceway surface 2d on the outer side of the outer ring 2. That is, the inner side ball row 5 and the outer side ball row 6 rotatably support the hub ring 3 and the inner ring 4 with respect to the outer ring 2. In the bearing device for a vehicle wheel 1, a double row angular contact ball bearing is formed of an outer ring 2, a hub ring 3 or an inner ring 4, and an inner side ball row 5 and an outer side ball row 6 interposed therebetween. In the bearing device for a vehicle wheel 1, the outer ring 2 and the inner ring 4 are configured to be relatively rotatable by the inner side ball row 5 and the outer side ball row 6 (see FIG. 2).

The cage 7 holds the balls 8. The cage 7 is formed of polyamide 46 (PA46), polyamide 66 (PA66), polyamide 9T (PA9T), polyetheretherketone (PEEK), polyphenylene sulfide (PPS), and the like being synthetic resins excellent in oil resistance, wear resistance, and lubrication. In the cage 7 of the present embodiment, as a reinforcing material, glass fiber (GF), carbon fiber (CF), or the like is kneaded in a resin and molded.

Figure 3:
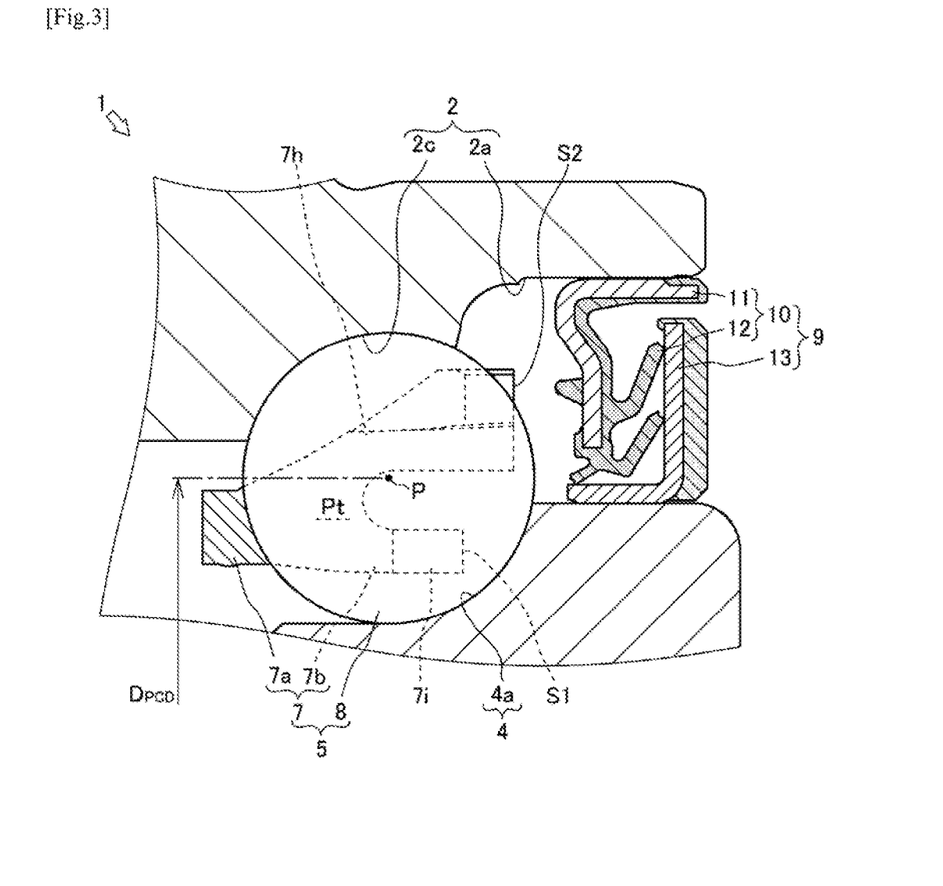
FIG. 3 is an enlarged step view showing a configuration of a ball and a cage according to the first embodiment of the bearing device for a vehicle wheel.

As shown in FIG. 3, the cage 7 is formed of a base portion 7a and a pillar portion 7b. The base portion 7a is annularly formed. The pillar portion 7b protrudes in the shaft direction from the base portion 7a. The pillar portions 7b are arranged at equal intervals along the circumferential direction of the base portion 7a. In the cage 7, pockets Pt for independently holding the balls 8 are formed at equal intervals between adjacent pillar portions 7b (see FIG. 4).

The ball 8 is rotatably held in the pocket Pt of the cage 7 via grease being a lubricant filled between the outer ring 2 and the inner ring 4.

The inner side seal member 9 closes a gap between the inner side opening 2a of the outer ring 2 and the inner ring 4. The inner side seal member 9 is formed of, for example, a two-side lip type pack seal for bringing two seal lips 12 into contact with each other. The inner side seal member 9 includes a substantially cylindrical seal plate 10 and a substantially cylindrical slinger 13.

The seal plate 10 is formed by fixing a seal lip 12 (see a light black portion) to a substantially cylindrical core metal 11. The core metal 11 is made of metal, and is formed of, for example, a ferritic stainless steel sheet (JIS standard SUS430 or the like), an austenitic stainless steel sheet (JIS standard SUS304 or the like), or a rust-proofed cold rolled steel sheet (JIS standard SPCC or the like). The core metal 11 is formed in a substantially L-shape in a shaft direction cross-sectional view. The seal lip 12 is formed of: acrylonitrile-butadiene rubber (NBR); hydrogenated acrylonitrile butadiene rubber (HNBR), ethylene propylene rubber (EPDM) which are excellent in heat resistance; polyacrylic rubber (ACM), fluoro rubber (EPDM) which are excellent in heat resistance and chemical resistance; or synthetic rubber such as silicon rubber, for example. The seal plate 10 is fitted into the inner side opening 2a of the outer ring 2.

The slinger 13 is formed of, for example, a steel sheet of a material the same as that of the seal plate 10. The slinger 13 is formed in a substantially L-shape in a shaft direction cross-sectional view. The slinger 13 is fitted into the inner ring 4. The slinger 13 is arranged on the inner side of the seal plate 10 in a state of facing the seal plate 10.

Thus, the inner side seal member 9 forms a pack seal from the seal plate 10 fitted into the inner side opening 2a of the outer ring 2 and the slinger 13 fitted into the inner ring 4. The seal lip 12 of the seal plate 10 is in contact with or close to the slinger 13 via the oil film and mainly prevents leakage of grease inside the bearing device for a vehicle wheel 1 to the outside or entry of muddy water or the like from the outside into the inside. It should be noted that in the following embodiments, the inner side seal member 9 has only to be a pack seal including one or a plurality of seal lips 12.

As shown in FIG. 2, the outer side seal member 16 closes a gap between the outer side opening 2b of the outer ring 2 and the hub ring 3. The outer side sealing member 16 includes a seal lip 14 fixed to a substantially cylindrical core metal 15.

The core metal 15 of the outer side seal member 16 is formed of, for example, a ferritic stainless steel sheet (JIS standard SUS430 or the like), an austenitic stainless steel sheet (JIS standard SUS304 or the like), or a rust-proofed cold rolled steel sheet (JIS standard SPCC or the like). The core metal 15 is formed in a substantially L-shape in a shaft direction cross-sectional view. The seal lip 14 is formed of: acrylonitrile-butadiene rubber (NBR); hydrogenated acrylonitrile butadiene rubber (HNBR), ethylene propylene rubber (EPDM) which are excellent in heat resistance; polyacrylic rubber (ACM), fluoro rubber (FKM) which are excellent in heat resistance and chemical resistance; or synthetic rubber such as silicon rubber, for example.

The core metal 15 is fitted into the outer side opening 2b of the outer ring 2. On this occasion, the outer side seal member 16 is arranged such that the seal lip 14 is in contact with the seal sliding surface of the hub ring 3 via an oil film. The outer side seal member 16 is configured to be slidable on the seal sliding surface. Thus, the seal lip 14 prevents leakage of lubricating grease from the outer side opening 2b of the outer ring 2 and entry of rainwater or muddy water from the outside.

In the thus configured bearing device for a vehicle wheel 1, the hub ring 3 and the inner ring 4 are rotatably supported via the inner side ball row 5 and the outer side ball row 6 in which a plurality of balls 8 are held at equal intervals by the cage 7. In addition, in the bearing device for a vehicle wheel 1, the gap between the inner side opening 2a of the outer ring 2 and the inner ring 4 is closed by the inner side seal member 9, and the gap between the outer side opening 2b of the outer ring 2 and the hub ring 3 is closed by the outer side seal member 16. Thus, the bearing device for a vehicle wheel 1 prevents leakage of lubricating grease from the inside and entry of rainwater or muddy water from the outside.

In the following, the cage 7 will be described in detail with reference to FIGS. 3 to 6B. It should be noted that in the following description, the radial direction is assumed to indicate a radial direction of the base portion 7a of the cage 7. The shaft direction is assumed to indicate a shaft direction of the base portion 7a. The circumferential direction is assumed to indicate a circumferential direction of the base portion 7a.

As shown in FIG. 3, the base portion 7a is positioned on the inner diameter side of the pitch circle PCD of the ball 8. In the present embodiment, the entire base portion 7a is positioned on the inner diameter side of the pitch circle PCD, but a part of the base portion 7a may be positioned on the outer diameter side of the pitch circle PCD. It should be noted that in FIG. 3, $D_{PCD}$ indicates a pitch circle PCD of the ball 8.

The inner diameter surface of each pillar 7b extends in the shaft direction. The outer diameter surface of the pillar portion 7b includes a first portion that extends to be inclined so as to be away radially outward with respect to the outer circumferential surface of the base portion 7a from the tip of the base portion 7a, and a second portion extending horizontally in the shaft direction from the first portion. In other words, the pillar portion 7b has a portion whose width in the radial direction increases from the base portion 7a toward the tip. The outer diameter surface of the pillar portion 7b protrudes toward the shaft direction outer side from the inner diameter surface of the pillar portion 7b.

Figure 4:
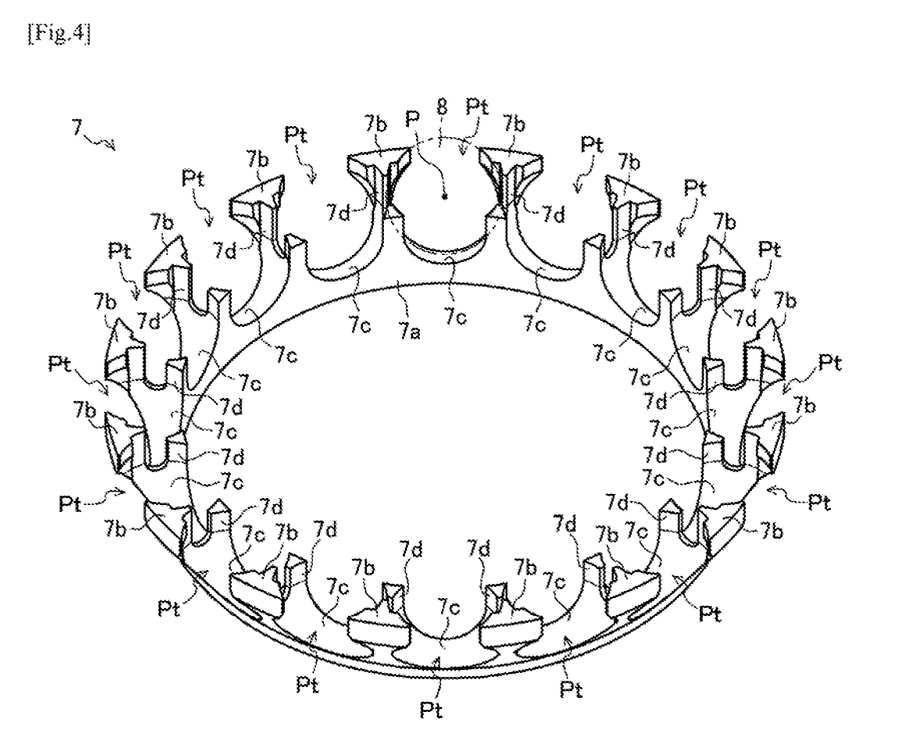
FIG. 4 is a perspective view showing an overall configuration of the cage according to the first embodiment of the bearing device for a vehicle wheel.
Figure 5A:
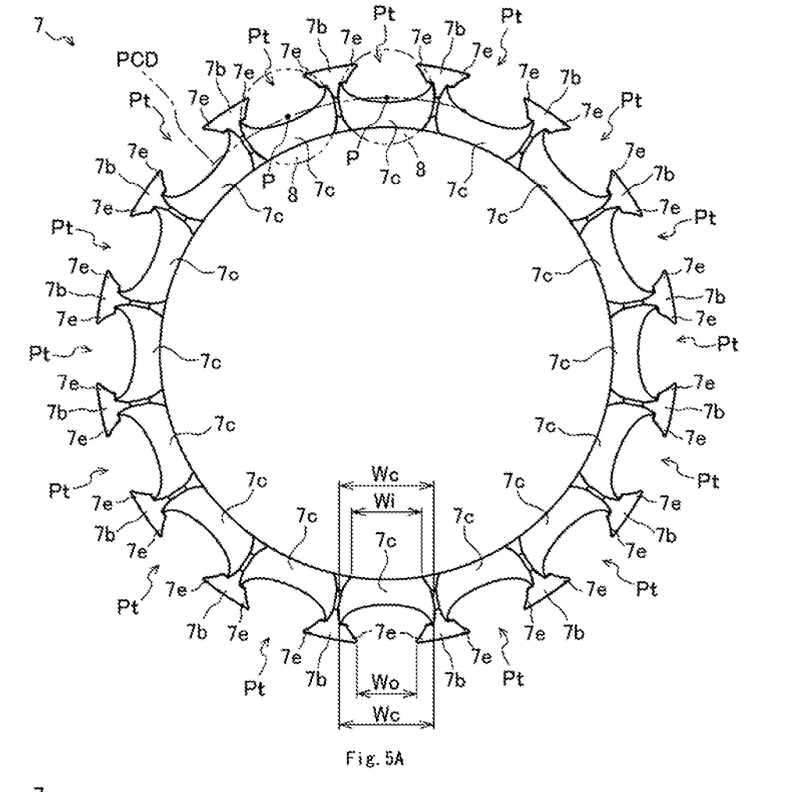
FIG. 5A is a plan view showing an overall configuration of the cage according to the first embodiment of the bearing device for a vehicle wheel.

As shown in FIGS. 4 and 5A, in the portion including the base portion 7a side of the facing side surfaces of the adjacent pillar portions 7b and the base portion 7a therebetween, the concave curved surface 7c along the outer circumferential surface of the ball 8 arranged so that the center comes to the predetermined position P (see FIG. 3) is formed in a substantially hemispherical shape with the base portion 7a as the bottom. Furthermore, in the pillar portion 7b, a guide surface 7d that extends in the shaft direction from the edge of the hemispherical concave curved surface 7c toward the tip of the pillar portion 7b is formed. The guide surface 7d is curved with a curvature the same as the curvature of the edge of the concave curved surface 7c in a shaft direction view. The guide surface 7d is configured to guide the ball 8 from the tip of the pillar portion 7b to a space surrounded by the concave curved surface 7c. Thus, in the cage 7, a pocket Pt for holding the ball 8 using the concave curved surface 7c and the guide surface 7d is formed at equal intervals between adjacent pillar portions 7b.

As shown in FIG. 5A, bringing a ball 8 into contact with the inner surface of a pillar portion 7b regulates the minimum distance between adjacent balls 8 on the pitch circle PCD. The thickness of the pillar portion 7b is the thinnest on the pitch circle PCD, and becomes gradually thicker as the distance from the pitch circle PCD increases toward the inner diameter side and the outer diameter side.

Figure 5B:
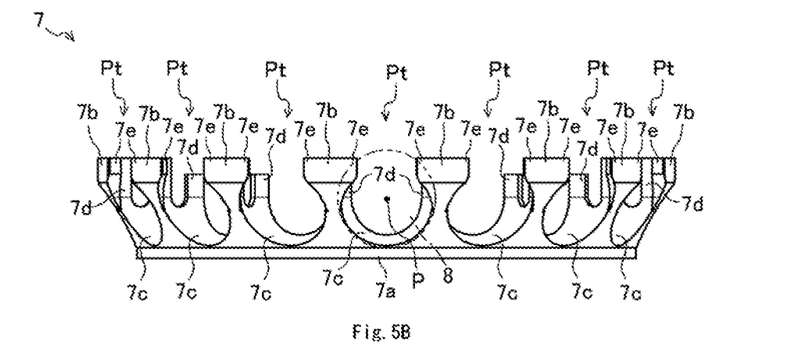
FIG. 5B is a side view showing an overall configuration of the cage according to the same.

As shown in FIGS. 5A and 5B, the concave curved surface 7c and the guide surface 7d of the pillar portion 7b are curved with the substantially central portion of the radial width of the pillar portion 7b as a bottom in a shaft direction view. The space between adjacent pillar portions 7b is formed such that the space Wi between radially inner ends and the space Wo between radially outer ends are smaller than the space Wc between radially substantial centers. Thus, the pillar portion 7b regulates the movement of the ball 8 arranged inside the pocket Pt to the radially inner side and the radially outer side. A claw portion 7e protruding toward adjacent pillar portions 7b (toward the pocket Pt) is formed at a tip portion of the pillar portion 7b. In other words, the respective claw portions 7e protrude from the tip portion of the pillar portion 7b on both sides in the circumferential direction.

Figure 6A:
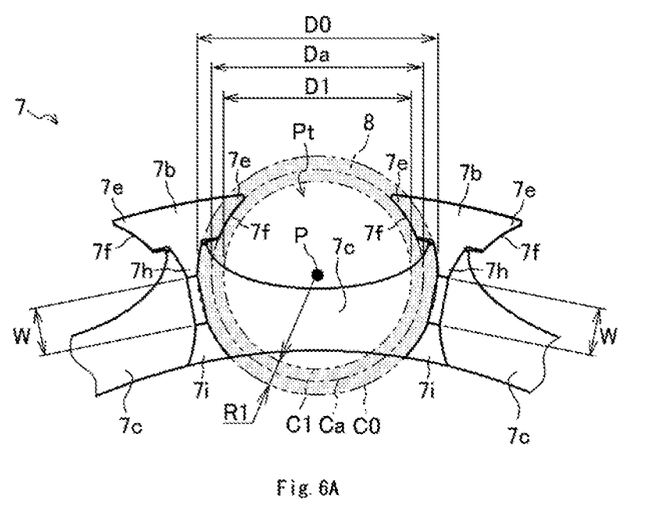
FIG. 6A is a partially enlarged plan view showing a relationship between a claw portion of the cage and a ball according to the first embodiment of the bearing device for a vehicle wheel.

As shown in FIG. 6A, in a shaft direction view, the tip portion of the claw portion 7e is formed to be included in an annular range (light black portion) having a radial width R1 surrounded by a reference virtual circle C1 having a diameter D1 centered on a predetermined position P and an outer circumferential circle C0 of a ball 8 having a diameter D0. The reference virtual circle C1 is concentric with the outer circumferential circle C0 of the ball 8, and the diameter D1 of the reference virtual circle C1 is smaller than the diameter D0 of the outer circumferential circle C0. Specifically, the diameter D1 of the reference virtual circle C1 is set to be 0.8 times or more and less than 1 times the diameter D0 of the ball 8.

The tip portion on the pocket Pt side of the claw portion 7e is cut out in a chamfered shape so as to be included in the radial width R1. At the tip portion of the claw portion 7e, in a shaft direction view, a guiding surface 7f being an arc surface along a virtual circle Ca having any diameter Da larger than the reference virtual circle C1 having the diameter D1 and smaller than the outer circumferential circle C0 of the ball 8 having the diameter D0 is formed. The diameter of the virtual circle Ca is larger than the diameter of the reference virtual circle C1 and smaller than the diameter of the outer circumferential circle C0 of the ball 8. In addition, the tip portion of the claw portion 7e is configured to be in contact with the outer circumferential surface of the ball 8 whose center is arranged at a predetermined position P (see FIG. 3). Thus, the pillar portion 7b regulates the movement in the shaft direction of the ball 8 arranged in the pocket Pt with the claw portion 7e. It should be noted that the guiding surface 7f is formed to be a curved surface along the virtual circle Ca, but may be a flat surface approximating the virtual circle Ca.

Figure 6B:
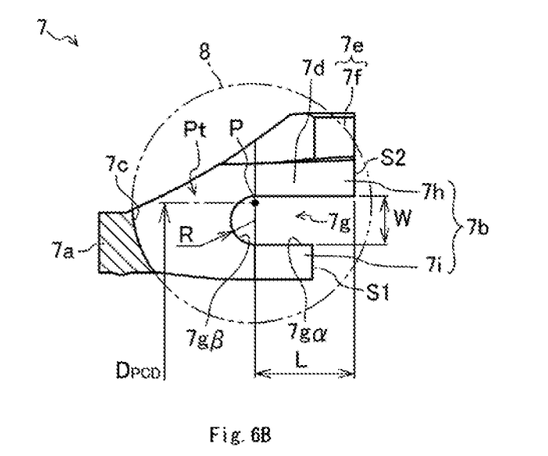
FIG. 6B is a partially enlarged cross-sectional view showing a cutout portion of the cage according to the same.

As shown in FIG. 6B, at the substantially central portion of the radial width of the pillar portion 7b, a cutout portion 7g including a slit portion 7gα having a radial width W and a shaft direction length L and a curved surface portion 7gβ having a radius R is formed from the tip toward the base portion 7a side. The bottom portion of the cutout portion 7g (curved surface portion 7gβ) is provided on the base portion side 7a with respect to the center P of the ball 8. Thus, at the ball center P where the distance between adjacent balls 8 is the shortest, providing the bottom portion of the cutout portion 7g on the base portion 7a side with respect to the center P allows the distance between balls 8 to be reduced, and the number of balls 8 to be increased.

The curved surface portion 7gβ is provided at the terminal end portion of the slit portion 7gα. The pillar portion 7b is branched by a cutout portion 7g into a pillar in a radially outer side portion (hereinafter, simply referred to as "outer side pillar 7h") and a pillar in a radially inner side portion (hereinafter, simply referred to as "inner side pillar 7i"). The above-described claw portion 7e is formed at the tip portion of the outer side pillar 7h. The cutout portion 7g is formed to remove a portion that does not have necessary strength centered on a radially substantially central portion where the thickness of the pillar portion 7b is the smallest due to the concave curved surface 7c and the guide surface 7d. Thus, the cage 7 can secure the strength of the pillar portion 7b even if the space between balls 8 is reduced on the pitch circle PCD and the number of balls 8 to be held is increased. As described above, since the number of balls 8 can be increased, the bearing load applied to each of the balls 8 is reduced, the life of the bearing device for a vehicle wheel 1 can be improved, and eventually, the weight and the size of the bearing device for a vehicle wheel 1 can be reduced.

In addition, the center P of the ball 8 is provided within the range of the radial width of the cutout portion 7g. In the present embodiment, the center P of the ball 8 is provided on the outer diameter side with respect to the radial width center of the cutout portion 7g.

The radius R of the cutout portion 7g is set to be larger than 0.05 times and less than 0.3 times the diameter D0 of the ball 8 (0.05<R/D0<0.3). If the radius R falls below 0.05 times the diameter D0 of the ball, the incorporation property of the ball 8 into the cage 7 is lowered. If the radius R exceeds 0.3 times the diameter D0 of the ball 8, the rigidity of the cage 7 decreases. In addition, the radial width W of the cutout portion 7g is set to be larger than 0.2 times and less than 0.5 times the diameter D0 of the ball 8 (0.2<W/D0<0.5). If the radial width W falls below 0.2 times the diameter D0 of the ball 8, the ball 8 cannot be incorporated. If the radial width W exceeds 0.5 times the diameter D0 of the ball 8, the shape becomes without the pillar portion 7b, and the ball 8 cannot be held.

Forming the inner side ball row 5 and the outer side ball row 6 from the cage 7 and the ball 8 formed as described above allows, in the bearing device for a vehicle wheel 1, the accuracy of the relative positions between the outer ring 2, the hub ring 3, and the inner ring 4 to be improved and the same load to be applied in all radial directions. In addition, in the inner side ball row 5 and the outer side ball row 6, since each ball 8 is independently supported by the pocket Pt of the cage 7, wear and contact noise due to contact between balls 8 do not occur. Thus, in the present embodiment, adjacent balls 8 are held by the cage 7 to face each other directly and in a non-contact manner on the pitch circle PCD.

As shown in FIGS. 3 and 6A, the shaft direction end surface S1 of the inner side pillar 7i is deviated on the center P side of the ball 8 (base portion 7a side) with respect to the shaft direction end surface S2 of the outer side pillar 7h. It should be noted that the shaft direction end surface S1 of the inner side pillar 7i is provided on the shaft direction outer side with respect to the center P of the ball 8. The virtual circle Ca is defined by passing through a point where a ball is simultaneously in contact with adjacent inner side pillars 7i and claw portions 7e. Thus, since the virtual circle Ca is set by the inner side pillar 7i, which is deviated on the center P side of the ball 8 with respect to the shaft direction end surface S2 of the outer side pillar 7h, and the claw portion 7e, the diameter D1 of the virtual circle Ca can be increased as compared with the configuration of defining the virtual circle with the inner side pillar, which has the shaft direction end surface whose shaft direction position coincides with the shaft direction end surface of the outer side pillar, and the claw portion. Therefore, defining the shaft direction position of the inner side pillar 7i makes it easy to set the virtual circle Ca in the range of the radial width R1 (0.8 times or more and less than 1 times the diameter D0 of the ball 8) and allows the degree of freedom in designing the tip portion of the claw portion 7e to be improved. For example, the virtual circle Ca may be included in the range of the radial width R1 even if the tip portion of the claw portion 7e is not limited to the shape of the present embodiment (cut out in an arc shape).

Hereinafter, a deformation state of the cage 7 when the ball 8 is incorporated into the cage 7 from the shaft direction will be described with reference to FIGS. 7A to 7C. It should be noted that the ball 8 is assumed to be moved only in the shaft direction with a ball insertion tool or the like (not shown).

Figure 7A:
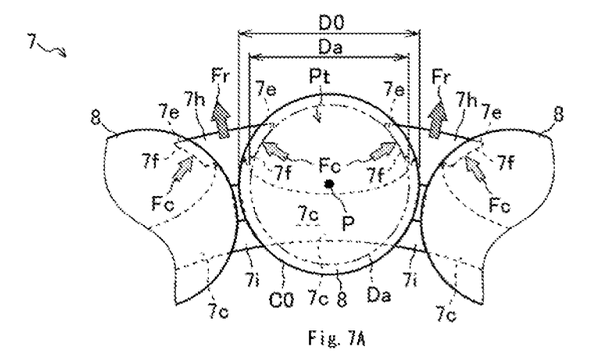
FIG. 7A is a partially enlarged plan showing a state before the ball is incorporated into the cage according to the first embodiment of the bearing device for a vehicle wheel.

As shown in FIG. 7A, when the ball is incorporated into the pocket Pt of the cage 7, the ball 8 is inserted from the tip side of the pillar portion 7b of the cage 7 toward the base portion 7a side along the shaft direction in a state of the center overlapping with the predetermined position P in a shaft direction view. The outer circumferential surface of the ball 8 is in contact with the guiding surface 7f of the claw portion 7e formed at the tip of the pillar portion 7b on each side of the pocket Pt. The guiding surface 7f of each claw portion 7e is in contact with the outer circumferential surface of the ball 8 at a position overlapping with the virtual circle Ca having any diameter Da set to the radial width R1 (see FIGS. 6A and 6B) being 0.8 times or more and less than 1 times the diameter D0 of the ball 8 in a shaft direction view.

When an external force is applied to move the ball 8 toward the base portion 7a side, the claw portion 7e slides on the outer circumferential surface of the ball 8 toward the outer circumferential circle C0 of the ball 8 in a shaft direction view. On this occasion, to the claw portion 7e, a force Fc (light light-black arrow) in the direction connecting the center of the ball 8 and the contact position on the outer circumferential surface is applied from each of the adjacent balls 8. As a result, to the claw portion 7e, a resultant force Fr (dark light-black arrow) obtained by combining the forces Fc and directed radially outward is applied.

Figure 7B:
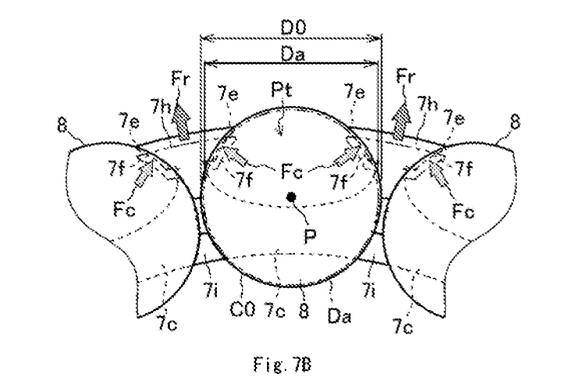
FIG. 7B is a partially enlarged plan view showing a state in which the ball is being incorporated into the cage according to the same.

As shown in FIG. 7B, when the ball 8 moves to the base portion 7a side, in the pillar portion 7b, the outer side pillar 7h where the claw portion 7e is formed is pushed radially outward by the generated resultant force Fr. The outer side pillar 7h is pushed radially outward until the tip portion of the claw portion 7e reaches the outer circumferential circle C0 of the ball 8 in a shaft direction view. The outer side pillar 7h is elastically deformed radially outward by an amount of about 0.1 times the diameter D0 of the ball 8 at the maximum (an amount corresponding to the radius of the virtual circle Ca having any diameter Da). On this occasion, since the shapes of the claw portion 7e and the cutout portion 7g are limited, the stress occurring in the pillar portion 7b is controlled to less than the allowable limit stress determined from the characteristics of the material of the cage 7.

Figure 7C:
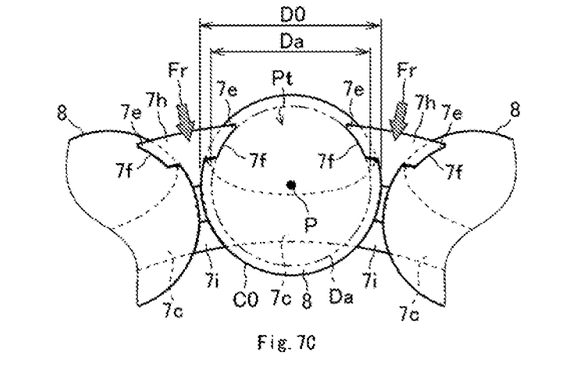
FIG. 7C is a partially enlarged plan view showing a state after the ball is incorporated into the cage according to the same.

As shown in FIG. 7C, the ball 8 reaches the guide surface 7d of the pillar portion 7b through the claw portion 7e due to the radially outward deformation of the outer side pillar 7h. In the pillar portion 7b, the tip portion of the claw portion 7e slides on the outer circumferential surface of the ball 8 from the outer circumferential circle C0 of the ball 8 radially inward in a shaft direction view by elastic force. The ball 8 is moved in the shaft direction along the guide surface 7d, and reaches the concave curved surface 7c. The claw portion 7e stops at a position overlapping with the virtual circle Ca having any diameter Da when viewed in a shaft direction view. The ball 8 is regulated in the movement radially outward and radially inward by the concave curved surface 7c and the guide surface 7d, and regulated in the movement in the shaft direction by the claw portion 7e. Thus, balls 8 are held by the cage 7 at equal intervals.

Thus, bringing the contact position between the claw portion 7e and the ball 8 closer to the outer circumferential circle C0 of the ball 8 in a shaft direction view with the guiding surface 7f of the claw portion 7e limits the range in which the claw portion 7e overlaps with the ball 8 in a shaft direction view to an amount of about 0.1 times the diameter D0 of the ball 8 at the maximum. In addition, if the ball 8 passes through the claw portion 7e, the pillar portion 7b of the cage 7 is not pushed wide by the ball 8. Therefore, in the cage 7, the deformation amount of the pillar portion 7b when a plurality of balls 8 are inserted into the pocket Pt of the cage 7 along the shaft direction is reduced. Thus, in the bearing device for a vehicle wheel 1, even if the cutout portion 7g is formed in the pillar portion 7b, the incorporation property of the ball 8 can be improved.

Table 1 shows evaluation results regarding the incorporation property of the ball 8 when the diameter D1 of the reference virtual circle C1 is changed with respect to the diameter D0 of the ball 8. In Table 1, "GOOD" means that the pillar portion of the cage was not damaged when the ball was incorporated, and "POOR" means that the pillar portion of the cage was damaged when the ball was incorporated.

TABLE 1

| D1/D0 | Ball incorporation result |
| --- | --- |
| 0.70 | Poor |
| 0.81 | Good |
| 0.90 | Good |

From Table 1, when the ball 8 is incorporated into the cage 7, it has been found that setting the diameter D1 of the reference virtual circle C1 obtained by connecting the contact points between the ball 8 and the pillar portion 7b of the cage 7 to 0.8 times or more and less than 1 times the diameter D0 of the ball 8 is optimal.

It should be noted that all the pillar portions 7b in the above-described embodiment include the respective cutout portions 7g, but at least one pillar portion 7b has only to include the cutout portion 7g. In the cage 7, the radially outward movement of the ball 8 adjacent to the pillar portion 7b including the cutout portion 7g allows the degree of freedom in the circumferential direction of other balls 8 to increase and allows the incorporation property of all the balls 8 to be improved. It is assumed that a through hole having a radius R is formed in a pillar portion 7b having no cutout portion 7g. In addition, in the above-described embodiment, an example has been described in which the ball 8 is incorporated into the cage 7 from the shaft direction, but the present invention may be applied to a case where the ball 8 is incorporated into the cage 7 from the radial outside.

Figure 8A:
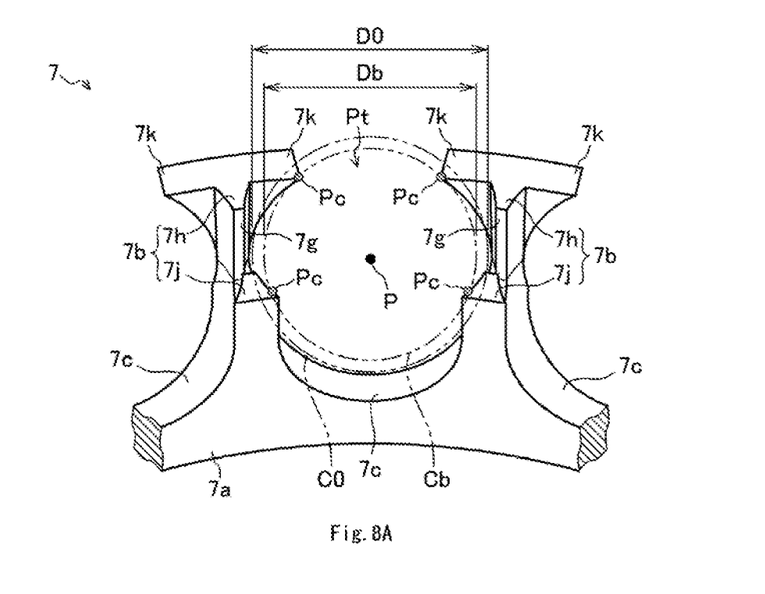
FIG. 8A is a partially enlarged perspective view showing a relationship between a claw portion of a cage and a ball according to a second embodiment of the bearing device for a vehicle wheel.

Next, a second embodiment of the bearing device for a vehicle wheel 1 according to the present invention will be described with reference to FIGS. 8A and 8B. It should be noted that a bearing device for a vehicle wheel 1 according to the following embodiment will be applied in place of the bearing device for a vehicle wheel 1 shown in FIGS. 1 to 7C, the same components are indicated by using the names, figure numbers, and reference numerals used in the above description, and in the following each embodiment, a detailed description of points the same as those of the already described embodiment will be omitted, and different points will be mainly described.

In the pillar portion 7b of the cage 7, an outer side pillar 7h and an inner side pillar 7j are formed by the cutout portion 7g. A claw portion 7k protruding toward adjacent pillar portions 7b is formed at the outer side pillar 7h of the pillar portion 7b. In other words, the respective claw portions 7k protrude from the tip portion of the pillar portion 7b on both sides in the circumferential direction. Thus, the pillar portion 7b regulates the movement in the shaft direction of the ball 8 arranged in the pocket Pt with the claw portion 7k.

When the ball 8 is arranged to be simultaneously in contact at four points with each claw portion 7k and each inner side pillar 7j on the pocket Pt side of the adjacent pillar portions 7b, a circle connecting the contact points Pc between the ball 8 and each claw portion 7k and between the ball 8 and each inner side pillar 7j is assumed to be a virtual circle Cb having a diameter Db. The diameter Db of the virtual circle Cb increases as the length of the inner side pillar 7j decreases (as the tip portion of the inner side pillar 7j is separated from the claw portion 7k).

Figure 8B:
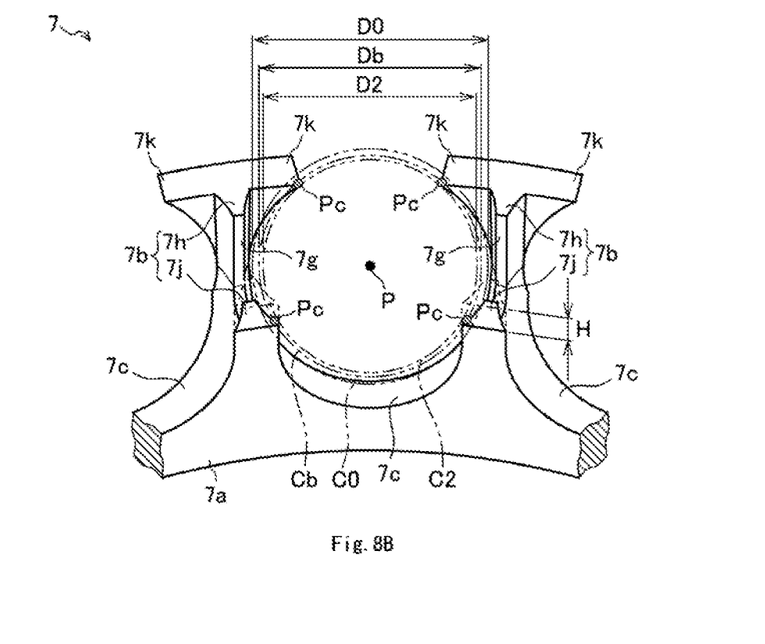
FIG. 8B is a partially enlarged perspective view showing a relationship between the claw portion and the ball when the length of the pillar portion of the cage is changed according to the same.

As shown in FIG. 8B, the diameter Db of the virtual circle Cb can be increased by reducing the length of the inner side pillar 7j by H. The length of the inner pillar 7j is determined so that the diameter Db of the virtual circle Cb is included in the range from the reference virtual circle C2 having a diameter D2 to the outer circumferential circle C0 of the ball 8, the reference virtual circle C2 being on the same plane as the virtual circle Cb and having the same center as the virtual circle Cb, the outer circumferential circle C0 projected on the same plane as the virtual circle Cb. The virtual circle C2 having a diameter D2 is set to be 0.9 times or more and less than 1 times the diameter D0 of the ball 8. Table 2 shows evaluation results regarding the incorporation property of the ball 8 when the diameter D2 of the reference virtual circle C2 is changed with respect to the diameter D0 of the ball 8. In Table 2, "GOOD" means that the pillar portion of the cage was not damaged when the ball was incorporated, and "POOR" means that the pillar portion of the cage was damaged when the ball was incorporated.

TABLE 2

| D2/D0 | Ball incorporation result |
|---|---|
| 0.87 | Poor |
| 0.92 | Good |
| 0.96 | Good |

From Table 2, when the ball 8 is incorporated into the cage 7 from the shaft direction, it has been found that setting the diameter D2 of the reference virtual circle C2 obtained by connecting the four contact points Pc between the ball 8 and the pillar portion 7b of the cage 7 to 0.9 times or more and less than 1 times the diameter D0 of the ball 8 is optimal.

Thus, determining the length of the inner side pillar 7j of the pillar portion 7b so that the contact position between the inner side pillar 7j and the ball 8 approaches the outer circumferential circle C0 of the ball 8 limits the range in which the claw portion 7k of the pillar portion 7b and the inner side pillar 7j overlap with the ball 8 to an amount of about 0.05 times the diameter D0 of the ball 8 at the maximum. Therefore, in the cage 7, the deformation amount of the pillar portion 7b when a plurality of balls 8 are inserted into the pocket Pt along the shaft direction is reduced. Thus, in the bearing device for a vehicle wheel 1, even if the cutout portion 7g is formed in the pillar portion 7b of the cage 7, the incorporation property of the ball 8 can be improved.

As described above, the embodiments of the present invention have been described. However, the present invention is not limited to these embodiments at all, is merely exemplary, and it is needless to say that the present invention can be implemented further in various forms without departing from the gist of the present invention. The scope of the present invention is shown by the description in the claims, and further includes the equivalent meaning as described in the claims and all the changes within the claims. In addition, in the present embodiment, the bearing device for a vehicle wheel 1 is configured as a bearing device for a vehicle wheel of the third-generation structure in which the inner side raceway surface 3c is directly formed on the outer circumference of the hub ring 3, but the bearing device for a vehicle wheel 1 is not limited thereto, and may be that of the second-generation structure in which a pair of inner rings 4 are press-fitted and fixed to the hub ring 3 or may be that of the first-generation structure in which double-row angular contact ball bearings are fitted into between a knuckle and a hub ring.

REFERENCE SIGNS LIST

1 bearing device for a vehicle wheel
2 outer ring
2a inner side opening
3 hub ring
4 inner ring
7 cage
7a base portion
7b pillar portion
7e claw portion
7g cutout portion
7h outer side pillar
7i inner side pillar
8 ball
C1 reference virtual circle
Ca virtual circle
Da diameter of virtual circle
S1 shaft direction end surface
S2 shaft direction end surface

The invention claimed is:

1. A bearing device for a vehicle wheel comprising:
an outer member provided with outer side raceway surfaces in double rows on an inner circumference;
an inner member including a hub ring formed with a reduced diameter step portion extending in a shaft direction on an outer circumference, and at least one inner ring press-fitted into the reduced diameter step portion, the inner member provided with inner side raceway surfaces in double rows facing the outer side raceway surfaces in double rows on an outer circumference;
balls in double rows accommodated in a rollable manner between both raceway surfaces of the outer member and the inner member; and
a cage made of resin including a base portion formed in an annular shape and a plurality of pillar portions extending in a shaft direction of the bearing device for the vehicle wheel at a constant interval in a circumferential direction from the base portion, the pillar portions adjacent to each other and the base portion forming pockets, each pocket having a curved surface along an outer circumferential surface of a respective one of the balls, the cage being configured to hold the balls in the pockets, respectively, wherein
each pillar portion includes a claw portion protruding toward adjacent pillar portions,
at least one pillar portion of the plurality of pillar portions includes a cutout portion extending from a tip of the at least one pillar portion toward the base portion,
a tip portion of each claw portion is included in an annular range surrounded by a reference virtual circle having a predetermined radius centered on a center of a respective one of the balls and an outer circumferential circle of the respective one of the balls in a shaft direction view, and
for the at least one pillar portion, a center of one of the balls is provided on an outer diameter side with respect to a radial width center of the cutout portion, and a radius of the cutout portion is set to be larger than 0.05 times a diameter of the one of the balls and less than 0.3 times the diameter of the one of the balls.

2. The bearing device for a vehicle wheel according to claim 1, wherein a guiding surface along a virtual circle having any radius from a center of one of the balls is formed at the tip portion of each claw portion.

3. The bearing device for a vehicle wheel according to claim 1, wherein each pocket includes a hemispherical curved surface with the base portion as a bottom portion, and a guide surface extending in a shaft direction from an edge of the hemispherical curved surface toward the tip of a respective one of the pillar portions.

4. The bearing device for a vehicle wheel according to claim 1, wherein a diameter of the reference virtual circle having the predetermined radius is 0.8 times or more and less than 1 times a diameter of one of the balls.

5. The bearing device for a vehicle wheel according to claim 1, wherein
the at least one pillar portion includes an inner side pillar provided on an inner diameter side with respect to the cutout portion and an outer side pillar provided on an outer diameter side with respect to the cutout portion, a shaft direction end surface of the inner side pillar is deviated on a center side of the respective one of the balls with respect to a shaft direction end surface of the outer side pillar, and the virtual circle passes through points where the respective one of the balls is simultaneously in contact with adjacent inner side pillars and the adjacent claw portions.

6. A bearing device for a vehicle wheel comprising:

an outer member provided with outer side raceway surfaces in double rows on an inner circumference;

an inner member including a hub ring formed with a reduced diameter step portion extending in a shaft direction on an outer circumference, and at least one inner ring press-fitted into the reduced diameter step portion, the inner member provided with inner side raceway surfaces in double rows facing the outer side raceway surfaces in double rows on an outer circumference;

balls in double rows accommodated in a rollable manner between both raceway surfaces of the outer member and the inner member; and a cage made of resin including a base portion formed in an annular shape and a plurality of pillar portions extending in a shaft direction of the bearing device for the vehicle wheel at a constant interval in a circumferential direction from the base portion, the pillar portions adjacent to each other and the base portion forming pockets, each pocket having a curved surface along an outer circumferential surface of a respective one of the balls, the cage being configured to hold the balls in the pockets, respectively, wherein in each pillar portion, an outer side pillar and an inner side pillar are formed by a cutout portion from a tip of the pillar portion toward the base portion, in each outer side pillar, a claw portion protruding toward the adjacent outer side pillars is formed, for each ball, when the ball is incorporated into the cage, a diameter of a virtual circle passing through points where the ball is simultaneously in contact with adjacent inner side pillars and adjacent claw portions is 0.9 times or more and less than 1 times a diameter of the ball, and for each ball, a center of the ball is provided on an outer diameter side with respect to a radial width center of a respective one of the cutout portions, and a radius of the respective one of the cutout portions is set to be larger than 0.05 times the diameter of the ball and less than 0.3 times the diameter of the ball.

* * * * *